United States Patent
Price

[11] Patent Number: 5,303,858
[45] Date of Patent: Apr. 19, 1994

[54] CARGO RACK FOR PICKUP TRUCKS

[76] Inventor: Brent A. Price, 1211 Bonfoy Ave., Colorado Springs, Colo. 80909

[21] Appl. No.: 16,101

[22] Filed: Feb. 10, 1993

[51] Int. Cl.$^5$ .............................................. B60P 3/00
[52] U.S. Cl. .................................. 224/42.45 R; 296/3; 224/42.03; 224/42.44; 224/282; 224/320; 224/319
[58] Field of Search ............................ 296/3, 37.6, 37.7; 211/183, 182, 195; 224/42.44, 42.42, 42.43, 282, 317, 320, 321, 309, 325, 319, 43.03 B, 42.45 R

[56] References Cited

U.S. PATENT DOCUMENTS

| | | | |
|---|---|---|---|
| 3,744,689 | 7/1973 | Kjensmo | 224/42.03 B |
| 3,891,262 | 6/1975 | Brunel | 224/42.45 R |
| 4,152,020 | 5/1979 | Brown et al. | 296/3 |
| 4,278,175 | 7/1981 | Jackson | 224/42.45 R |
| 4,398,763 | 8/1983 | Louw | 296/3 |
| 4,659,131 | 4/1987 | Flournoy, Jr. | 296/3 |
| 4,770,458 | 9/1988 | Burke et al. | 296/3 |
| 4,823,997 | 4/1989 | Krieger | 224/42.03 B |
| 4,887,754 | 12/1989 | Boyer et al. | 224/319 |
| 5,037,152 | 8/1991 | Hendricks | 296/3 |
| 5,152,570 | 10/1992 | Hood | 296/3 |
| 5,190,337 | 3/1993 | McDaniel | 296/3 |

FOREIGN PATENT DOCUMENTS 63784 7/1949 Netherlands ................ 224/42.03 B

*Primary Examiner*—Ernest G. Cusick
*Attorney, Agent, or Firm*—Richard W. Hanes

[57] ABSTRACT

A mounting rack for pickup trucks that have a cargo bed with upstanding lateral side walls where the rack includes a pair of base forming rails adapted to be surmounted on the top fenders of the truck cargo bed, a pair of rigid frames attached centrally to the respective rails in a position upstanding from the side walls or top fenders of the truck cargo bed and at least one cross beam interconnecting the uppermost portions of the said rigid frames. The rack further includes cargo support cradles shaped like "U" shaped bail members carried by each of the rails and projecting laterally from the cargo bed of the truck to support bikes or other additional cargo.

5 Claims, 5 Drawing Sheets

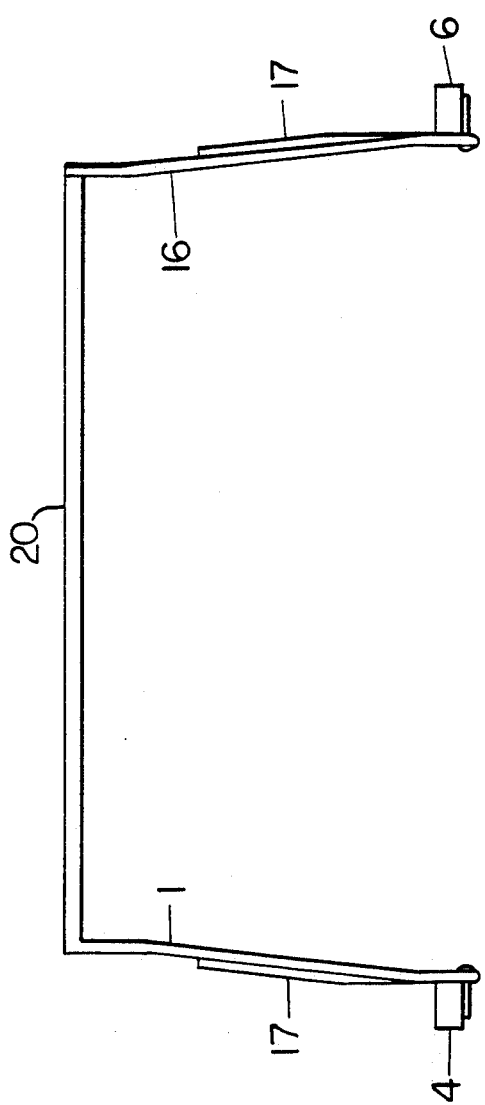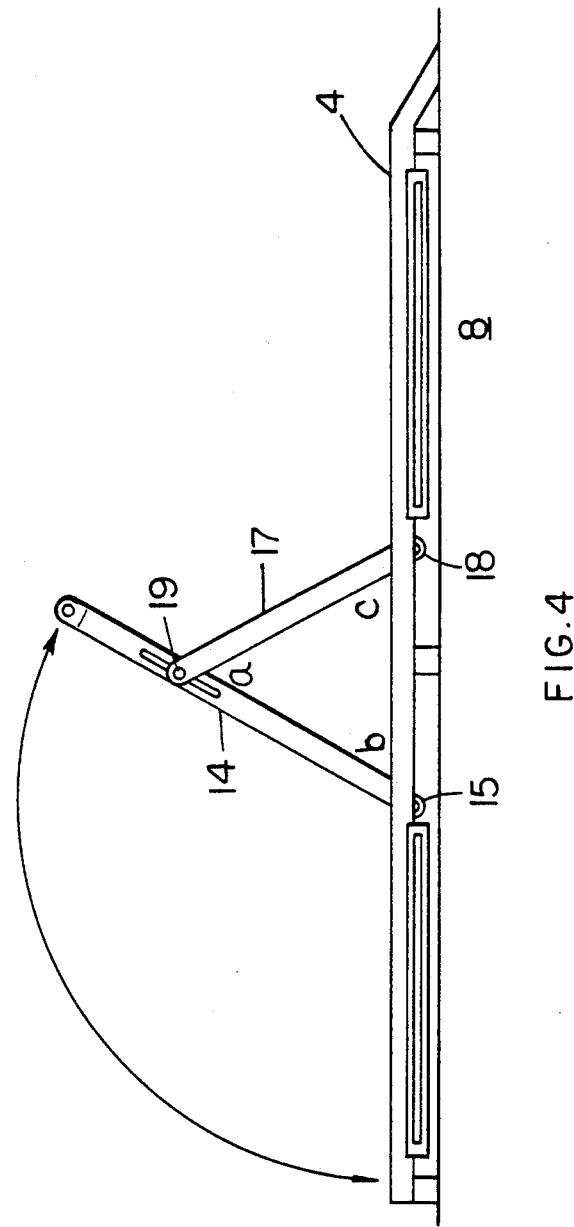

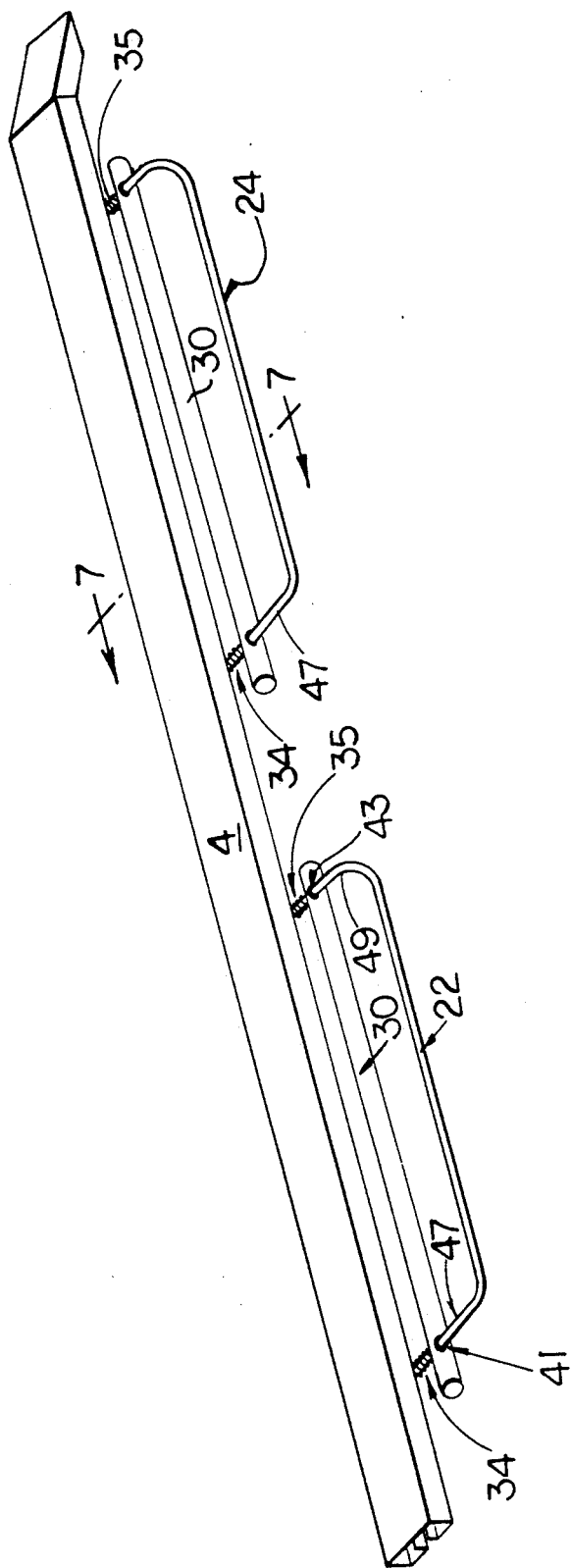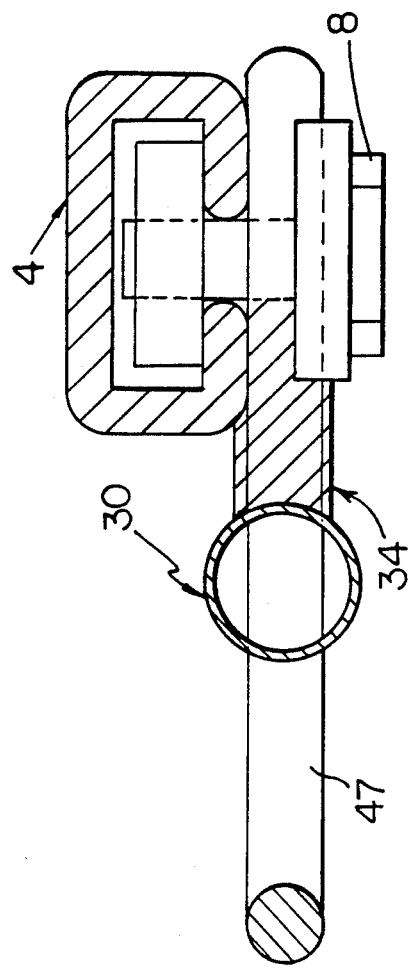

CARGO RACK FOR PICKUP TRUCKS

The present invention relates to a structural rack to be mounted around the bed of a pickup truck to support bicycles, boats and other cargo.

BACKGROUND OF THE INVENTION

Racks designed to carry bicycles on motor vehicles are plentiful and are found in a variety of designs and configurations but each of them possess disadvantages which are resolved by the rack of the present invention, at least with respect to pickup truck type of vehicles. Many of the racks are described in U.S. Patents, the most pertinent of which are described below.

A vehicle mounted foldable bicycle carrier is disclosed in U.S. Pat. No. 4,875,608 which utilizes U-shaped channels members to support the wheels of a bicycle however the remaining portion of the rack is markedly dissimilar to the rack of the present invention and could not be mounted in the bed of a pickup truck.

U.S. Pat. No. 4,398,763 discloses a load carrier for a motor load vehicle which is generally constructed over the sides of a light delivery van but the structure as taught by the patentee could not be used in the same manner or for the same purpose as the carrier of the present invention.

Many pickup truck bicycle racks mount inside of the truck bed and secure the bicycle front fork with the wheel removed. Bicycles and other types of cargo may, of course, be carried in the bed of a pickup truck without any rack or other support at all, but in so doing valuable space within the bed of the truck is occupied when, by utilizing the rack of the present invention, that space could be saved.

It is therefore the primary object of the present invention to provide a bicycle rack for pickup trucks which can mount at least two "race ready" bicycles without compromising the bed space for other cargo.

A second object of the invention is to provide a bicycle rack for a pickup truck which is readily accessible and does not require that the bicycle be lifted far overhead for placement into the cradling parts of the rack.

A third object of the invention is to provide a bicycle support for attachment to a truck type of vehicle which will support the bicycle by its wheels, the one constant feature of bicycle design.

Another object of the invention is to provide a bicycle support which may be collapsed or folded into an out-of-the-way position when not carrying its cargo.

A still further object of the invention is to provide a bicycle rack of the type described which, through the double usage of the novel supporting framework of the rack, a small boat or similar load can be supported over the bed without the consumption of truck bed storage space.

Another object of the invention is to provide a kind of "side saddle" mounting rack which will not interfere with rear view vision from the driver's station in the vehicle, either through a standard windshield mounted rear view mirror or side mounted mirrors but will, at the same time, afford the driver an opportunity to maintain a close watch on the cargo being transported on the rack of the present invention through the side mirrors on the vehicle.

Other and still further objects, features and advantages of the invention will become apparent upon a reading of the detailed description of a preferred form of the invention which follows.

SUMMARY OF THE INVENTION

The rack comprises a pair of frame members, each upstanding from and mounted on the respective sides of a pickup truck bed. The panels or frames are tied together at their topmost extensions with at least one rigid compression/tension member which can itself provide support for cargo, such as a boat, centrally of and above the truck bed. Extending laterally outwardly from the lower portion of each panel or frame are a pair of spaced apart supports which are sized and adapted to abut the tires on the wheels of the bicycle to sustain the weight of the bicycle.

THE DRAWINGS

FIG. 1 of the drawings is a side view of the rack of the present invention as mounted on a pickup truck and showing a bicycle in carrying position on one side of the rack with a light weight boat being carried on top of the rack.

FIG. 4 is a side elevational view of the rack of the present invention.

FIG. 5 is a rear elevational view of the rack.

FIG. 6 is a perspective view of one of the mounting rails of the rack and the attached wheel supporting cradles.

FIG. 7 is a cross sectional view taken along lines 7—7 of FIG. 6.

DETAILED DESCRIPTION

Figure 1:
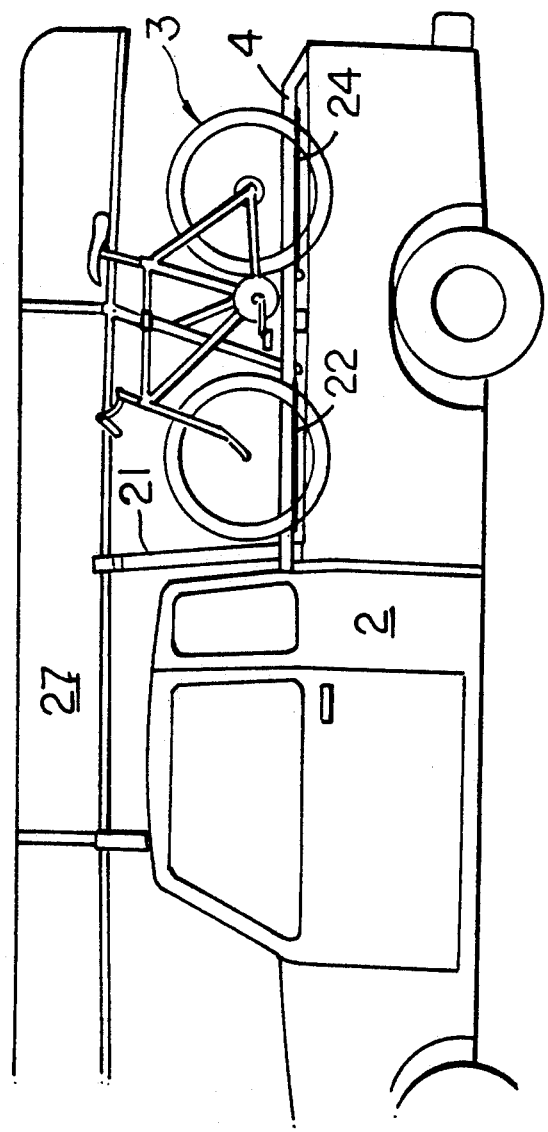
Figure 3:
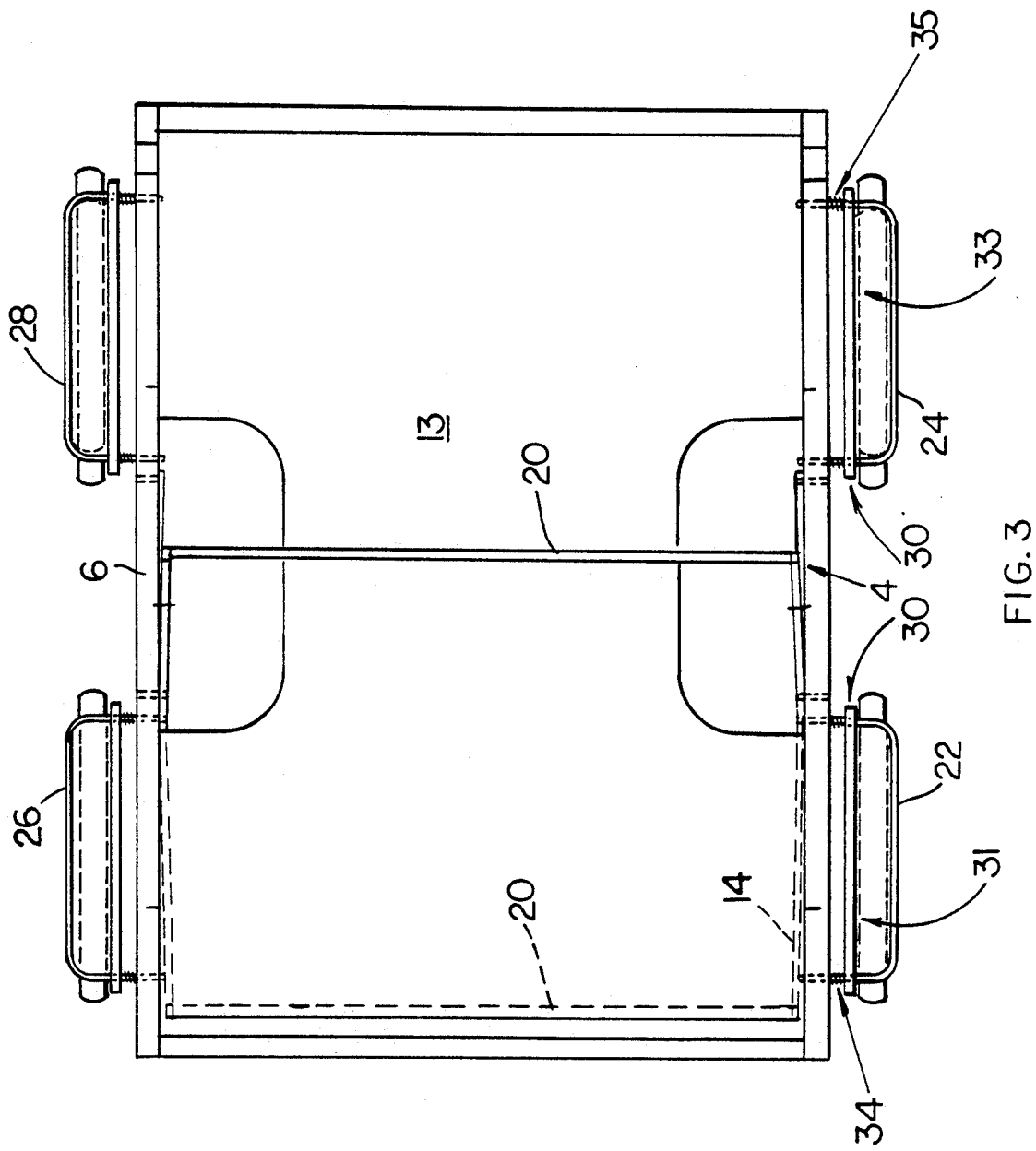
FIG. 3 is a top view of the rack as seen mounted on the bed of a pickup truck.

Viewing first the drawing of FIG. 1, the preferred form of the rack of the present invention is seen attached to a typical pickup truck 2 with a bicycle 3 attached to the near side of the rack. Looking at the side and top views of FIGS. 4 and 3 together, the rack comprises as its base a pair of mounting rails 4 and 6 which are attached respectively by any well known means to the upper surfaces of the lateral and upstanding sides or top fenders 8 and 10 of the truck bed 13.

Pivotally attached to a central portion of each of the mounting rails 4 and 6 are frame struts 14 and 16 respectively which each lie in and pivot within a plane which is inclined inwardly toward the truck bed from the base rail to which the strut is attached. Each of the struts may be elevated to the position shown in FIGS. 4, 5 and 8 or may be folded down to a storage position flat against the forward portion of the attaching rail, as shown in dotted lines in FIG. 8. The exact angle of the elevated position is fixed by a bracing bar 17 interconnecting the strut and its mounting rail. The bracing bar is also pivotally mounted on the mounting rail so as to be adjustable in setting the exact angle or position of the strut to which it is attached by a pin and slot interconnection 19. When the desired position of the frame strut is achieved the pin may be tightened against the sides of the slot to maintain the position in any well known manner to fix the dimensions of the triangle abc, establishing the strut in an upright position so that the upper part of the bicycle frame may be attached or lashed to it for the cycle's lateral support on the rack.

The bracing bars 17 on each side of the truck rack provide support for the respective struts 14 and 16 in the plane of their capable rotation around their respective pivot points 15 and 18 but the struts still require lateral support. That support is developed through the use of a horizontally disposed rigid cross beam 20 which spans the distance between the two side members of the rack and is attached to the upper ends of the struts 14 and 16 across the top of the truck bed. When the struts are folded down into storage position, as shown by dotted lines in FIG. 7, the compression/tension cross beam 20 takes a position just behind the forward end of the truck bed, substantially aligned with the top surface of the sides 8 and 10 and out of the way for the loading and unloading of other cargo which may be contained in the truck bed 13.

Figure 2:
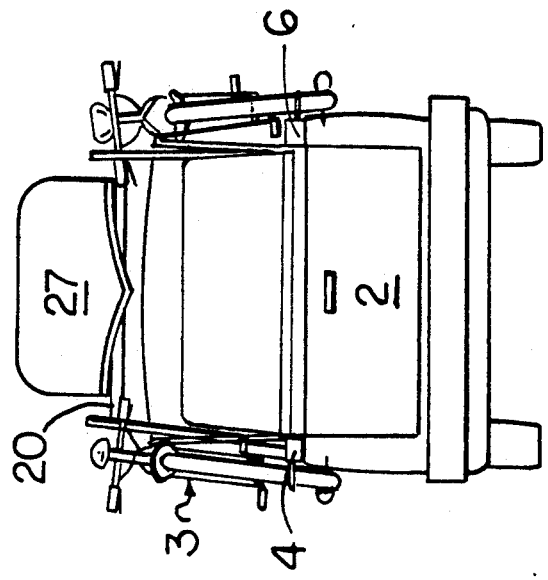
FIG. 2 is a rear elevational view of a truck on which the rack of the present invention is mounted, showing bicycles being carried on both sides of the rack.
Figure 8:
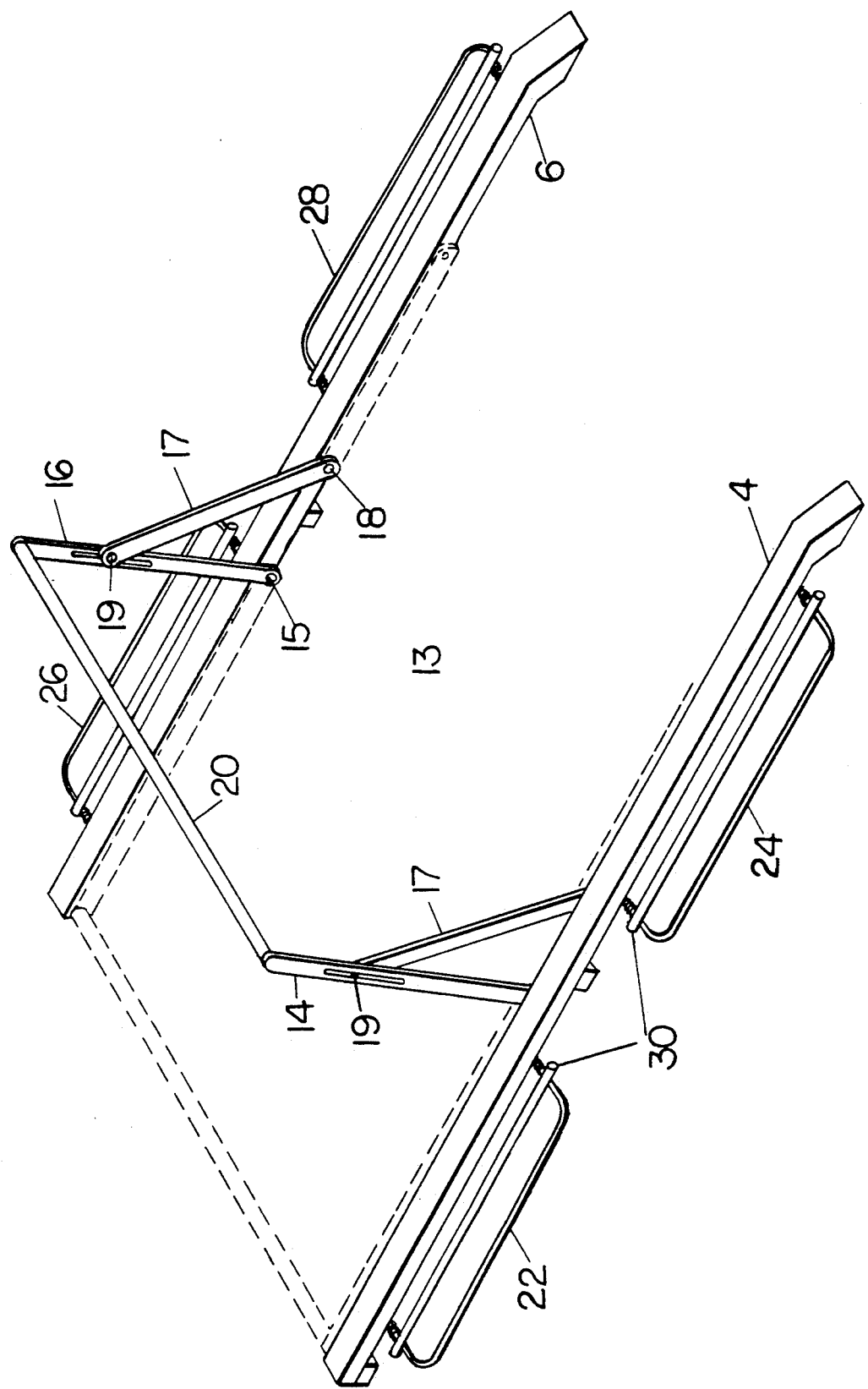
FIG. 8 is a perspective view of the complete rack.

Not a part of the inventive rack which is the subject of this disclosure, but shown in FIGS. 1, and 2, is a separate "headache" rack 21 which extends upwardly from the forward end of the truck bed and acts as a supplemental support for long cargo such as a boat 27, which utilizes the cross beam 20 as a part of its support, as shown in FIGS. 1, 5 and 8.

Laterally outwardly projecting cradles or other farms of wheel supports are carried by the base rails 4 and 6 to support a bicycle or other cargo. FIGS. 6, 7 and 8 illustrate front and back bicycle wheel supports made in the form of spaced apart balls 22 and 24 on one side and 26 and 28 on the other side of the truck rack. Illustrating by reference to the left side of the vehicle rack, the front and rear wheels 31 and 33 of a bicycle are received within the space between the mounting rail 4 and the outer extremity of the respective ball which is parallel to the rail 4. The longitudinal extent of each ball is of a dimension less that the diameter of the bicycle wheel to be received so that the wheel will not pass through the opening in the ball, but will be supported thereby. In order to hold each wheel of the bicycle firmly, a pressure bar 30 is carried by each of the balls. The pressure bar is parallel to the outer extremity of the ball and to the contained bicycle wheel and is disposed at a position which will be inside, or toward the truck body, of the wheel which is dropped into the support. Each end of the pressure bar is provided with an aperture 41 and 43 which loosely journals the respective legs 47 and 49 of each of the balls so that the pressure bar 30 may move inwardly or outwardly along the legs of the ball as tracks. Helical springs 34 and 35 disposed around each of the bail legs between the pressure bar 30 and the adjacent mounting rail provide a biasing force to maintain the pressure bar against the wheel of the bicycle to hold it firmly within the cradle formed by the ball.

I claim:

1. A mounting rack for pickup trucks having a cargo bed with upstanding lateral side walls, comprising in combination,
    first and second base forming rails adapted to be surmounted on the top fenders of the truck cargo bed;
    first frame means attached centrally to the first base forming rail in a position upstanding from the side wall of the truck cargo bed;
    second frame means attached centrally to the second base forming rail in a position upstanding from the side wall of the truck cargo bed;
    at least one cross beam interconnecting the uppermost portions of the said first and second frame means;
    first cargo support means carried by said first base forming rail and projecting laterally from the cargo bed of the truck, said first cargo support means having a first cradle thereon to support cargo; and
    second cargo support means carried by said second base forming rail and projecting laterally from the cargo bed of the truck, said second cargo support means having a second cradle thereon to support cargo.

2. The rack of claim 1 wherein said first frame means comprises a single first strut member attached to said first rail and a first bracing member interconnecting the first strut and the first rail to which the firs strut is attached to form a structural triangle, and
    said second frame means comprises a single second strut member attached to said second rail and a second bracing member interconnecting the second strut and the second rail to which the second strut is attached to form a structural triangle.

3. The rack of claim 2 and further comprising first pivotal connection means between said first strut member and the first rail and between said first bracing member and said first rail, and a second pivotal connection means between said second strut member and the second rail and between said second bracing member and said second rail.

4. A mounting rack for pickup trucks having a cargo bed with upstanding lateral side walls, comprising in combination,
    first and second base forming rails adapted to be surmounted on the top fenders of the truck cargo bed;
    first frame means attached centrally to the first base forming rail in a position upstanding from the side wall of the truck cargo bed;
    second frame means attached centrally to the second base forming rail in a position upstanding from the side wall of the truck cargo bed,
    at least one cross beam interconnecting the uppermost portions of the said first and second frame means,
    first cargo support means carried by said first base forming rail and projecting laterally from the cargo bed of the truck, said first cargo support means having a first cradle thereon to support cargo,
    second cargo support means carried by said second base forming rail and projecting laterally from the cargo bed of the truck, said second cargo support means having a second cradle thereon to support cargo,
    a single strut member attached to said first rail and a first bracing member interconnecting the first strut and the first rail to which the first strut is attached to form a structural triangle,
    a single second strut member attached to said second rail and a second bracing member interconnecting the second strut and the second rail to which the second strut is attached to form a structural triangle,
    first pivotal connection means between said first strut member and the first rail and between said first bracing member and said first rail,
    a second pivotal connection means between said second strut member and the second rail and between said second bracing member and said second rail,
    said first cradle comprises a generally "U" shaped first bail member having an outer extremity which is parallel to said first rail and having parallel legs which are perpendicular to the first rail and to the outer extremity of the first bail member, and said second cradle comprises a generally "U" shaped second bail member having an outer extremity which is parallel to said second rail and having parallel legs which are perpendicular to the second rail and to the outer extremity of the second bail member.

5. The rack of claim 4 wherein said first cradle further comprises a first movable pressure bar carried by the legs of the first bail member;

first spring means biasing the first pressure bar toward the outer extremity of the first bail member to which the first pressure bar is attached, and said second cradle further comprises a second movable pressure bar carried by the legs of the second bail member and second spring means biasing the second pressure bar toward the outer extremity of the second bail member to which the second pressure bar is attached.

* * * * *